United States Patent
Moon et al.

(10) Patent No.: US 11,044,636 B2
(45) Date of Patent: Jun. 22, 2021

(54) METHOD AND DEVICE FOR DETECTING CONGESTION IN DATA TRANSMISSION PATH

(71) Applicant: Samsung Electronics Co., Ltd., Suwon-si (KR)

(72) Inventors: Sang-Jun Moon, Seoul (KR); Jin-Sung Lee, Suwon-si (KR); Ki-Suk Kweon, Suwon-si (KR); Jung-Shin Park, Seoul (KR); Ji-Cheol Lee, Suwon-si (KR); Hyung-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 15/920,199

(22) Filed: Mar. 13, 2018

(65) Prior Publication Data

US 2018/0270711 A1  Sep. 20, 2018

(30) Foreign Application Priority Data

Mar. 14, 2017 (KR) .................. 10-2017-0031700

(51) Int. Cl.
| | |
|---|---|
| *H04W 28/10* | (2009.01) |
| *H04W 28/02* | (2009.01) |
| *H04W 28/04* | (2009.01) |
| *H04L 12/801* | (2013.01) |
| *H04L 12/807* | (2013.01) |
| *H04W 24/06* | (2009.01) |

(52) U.S. Cl.
CPC ............ *H04W 28/10* (2013.01); *H04L 47/11* (2013.01); *H04L 47/27* (2013.01); *H04L 47/37* (2013.01); *H04W 28/0236* (2013.01); *H04W 28/0273* (2013.01); *H04W 28/04* (2013.01); *H04L 47/115* (2013.01); *H04W 24/06* (2013.01)

(58) Field of Classification Search
CPC . H04W 28/10; H04W 28/04; H04W 28/0236; H04W 24/06; H04W 28/0273; H04W 47/37; H04W 47/11; H04W 47/27; H04W 47/115
See application file for complete search history.

(56) References Cited

U.S. PATENT DOCUMENTS

| | | | |
|---|---|---|---|
| 9,172,643 B2 | 10/2015 | Harrang et al. | |
| 9,407,508 B2 | 8/2016 | Chiang et al. | |
| 2009/0161545 A1* | 6/2009 | Ho .................. | H04L 47/263 370/235 |

(Continued)

OTHER PUBLICATIONS

Baranasuriya, Nimantha, et al., "QProbe: Locating the Bottleneck in Cellular Communication," CoNEXT '15, Dec. 1-4, 2015, Heidelberg, Germany, 7 pages.

*Primary Examiner* — Jianye Wu

(57) ABSTRACT

A method for detecting a section where congestion occurs in a data transmission path by a user equipment (UE) comprises receiving a first probe packet, receiving a second probe packet, measuring an interval in time of reception between the first probe packet and the second probe packet, determining whether the measured time interval exceeds a threshold, and determining whether a bottleneck occurs using a result of the determination and information contained in the probe packets, wherein the information contained in the probe packets is information about the time interval between the probe packets and transmission rates of load packets.

14 Claims, 10 Drawing Sheets

(56) References Cited

U.S. PATENT DOCUMENTS

| | | | |
|---|---|---|---|
| 2012/0320780 A1* | 12/2012 | Nakata | H04L 43/0894 370/252 |
| 2013/0136002 A1* | 5/2013 | Song | H04L 47/25 370/235 |
| 2014/0242916 A1* | 8/2014 | Bellamkonda | H04L 47/12 455/67.11 |
| 2018/0331955 A1* | 11/2018 | Ju | H04L 41/065 |

* cited by examiner

METHOD AND DEVICE FOR DETECTING CONGESTION IN DATA TRANSMISSION PATH

CROSS-REFERENCE TO RELATED APPLICATIONS AND CLAIM OF PRIORITY

This application claims priority under 35 U.S.C. § 119(a) of a Korean patent application filed in the Korean Intellectual Property Office on Mar. 14, 2017, and assigned Serial No. 10-2017-0031700, the entire disclosure of which is incorporated herein by reference.

TECHNICAL FIELD

The present disclosure concerns methods and devices for detecting congestion in a data transmission path.

BACKGROUND

In general, a data transmission path between a user equipment (UE) and a server (or Internet server) may include a wired path section or wireless path section.

FIG. 1 is a view illustrating a data transmission path between a UE and a server.

Referring to FIG. 1, a base station 103 and a gateway 105 may add over a data transmission path between a UE 101 and a server 107. The link (or section or connection section) between the UE 101 and the base station 103 may be a wireless one. The connection 113 between the base station 103 and the gateway 105 may be a wired one, and the connection 113 between the base station 103 and the gateway 105 is oftentimes referred to as a backhaul link. The connection 115 between the gateway 105 and the server 107 may be a wired one, which is also called a wide area network (WAN).

Dividing the data transmission path between UE and server depending on networks, the connections among the UE 101, the base station 103, and the gateway 105 may be a cellular network, and the connection between the gateway 105 and the server 107 may be an Internet network. The cellular network includes a wired connection and a wireless connection, but the Internet network includes a wired connection alone.

Where multiple UEs connect to the server, a different base station or gateway may be connected to each of the UEs. Since each UE requires a different data size or transmission speed, the section where a bottleneck (or congestion) arises differs from case to case.

The UE and the server may be unaware where in the data transmission path a bottleneck occurs as well as the transmission rate of each connection. This may be a problem.

The above information is presented as background information only to assist with an understanding of the present disclosure. No determination has been made, and no assertion is made, as to whether any of the above might be applicable as prior art with regard to the present disclosure.

SUMMARY

Accordingly, there is disclosed herein a method capable of detecting the section with a bottleneck in a data transmission path and inferring the transmission rate in the section. Therefore, the UE can adjust the transmission rate by transmitting the inferred transmission rate to the server.

According to the present disclosure, a method for detecting a section where congestion occurs in a data transmission path by a user equipment (UE) comprises receiving a first probe packet, receiving a second probe packet, measuring an interval in time of reception between the first probe packet and the second probe packet, determining whether the measured time interval exceeds a threshold, and determining whether a bottleneck occurs using a result of the determination and information contained in the probe packets, wherein the information contained in the probe packets is information about the time interval between the probe packets and transmission rates of load packets.

According to the present disclosure, a UE for detecting a section where congestion occurs in a data transmission path comprises a transceiver configured to receive a first probe packet and a second probe packet and a controller configured to measure an interval in time of reception between the first probe packet and the second probe packet, determine whether the measured time interval exceeds a threshold, and determine whether a bottleneck occurs using a result of the determination and information contained in the probe packets, wherein the information contained in the probe packets is information about the time interval between the probe packets and transmission rates of load packets.

According to the present disclosure, a method by a server supporting a UE that detects a section where congestion occurs in a data transmission path comprises generating a probe packet train including at least two probe packets and at least one load packet and transmitting the probe packet train to the UE, wherein the at least two probe packets contain information about a transmission rate of the at least one load packet and a time interval between the at least two probe packets.

According to the present disclosure, a server supporting a UE that detects a section where congestion occurs in a data transmission path comprises a controller configured to generate a probe packet train including at least two probe packets and at least one load packet and a transceiver configured to transmit the probe packet train to the UE, wherein the at least two probe packets contain information about a transmission rate of the at least one load packet and a time interval between the at least two probe packets.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

Throughout the drawings, like reference numerals will be understood to refer to like parts, components, and structures.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described in detail with reference to the accompanying drawings. When determined to make the subject matter of the present disclosure unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

Although the embodiments described below are separate from one another for ease of description, at least two or more of the embodiments may be combined together within such a range where they do not conflict one another.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

In this disclosure, inter-device link may be represented as a connection, section, or connection section between a device and another.

According to an embodiment of the present disclosure, a server may generate a probe packet train (PPT) to detect a section where a bottleneck occurs on a data transmission path and transmit the PPT to a user equipment (UE). The probe packet train means a probe packet, a sort of reference data, which the server transmits to the UE to grasp the circumstance of the data transmission path before transmitting data to the UE.

Figure 1:
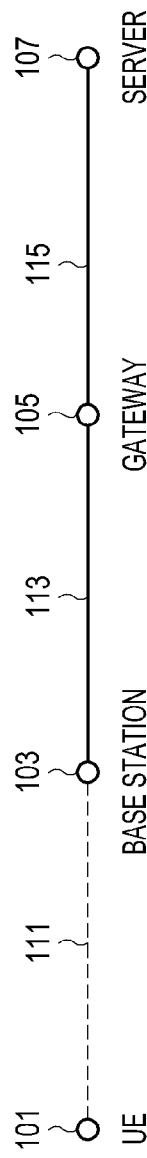
FIG. 1 is a view illustrating a data transmission path between a UE and a server.
Figure 2:
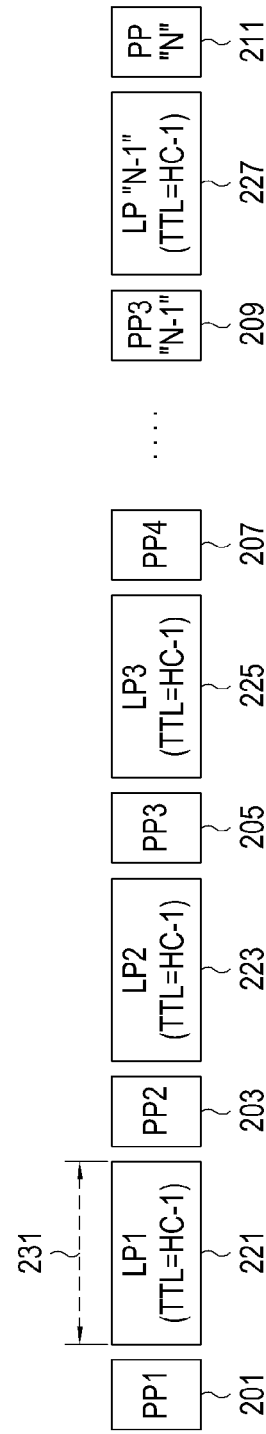
FIG. 2 is a view illustrating a structure of a probe packet train.

FIG. 2 is a view illustrating a structure of a probe packet train.

Referring to FIG. 2, a probe packet train includes probe packets (PP) 201, 203, 205, 207, 209, and 211 and load packets (LP) 221, 223, 225, and 227. In one embodiment, the number of the load packets may be smaller than the number of the probe packets. Each load packet may be positioned between consecutive ones of the probe packets.

According to an embodiment of the present disclosure, the transmission time interval (TTI) (or probe packet interval (PPI) 231 between probe packets is determined to be longer than the base station's scheduling time interval which applies in the cellular network. The time-to-live (TTL) of load packet is set to be shorter than the TTL of probe packet. According to an embodiment of the present disclosure, the TTL of load packet may be set to be shorter than the TTL of probe packet by the transmission delay time corresponding to at least one hop. Here, one hop means the distances between nodes at IP level. The size and number of load packets may be varied depending on the given transmission rate of load packet. In general, the transmission rate of load packet is set to gradually increase within the probe packet train. As necessary, the transmission rate of load packet may be set to gradually decrease within the probe packet train. A probe packet may include the sequence number of the probe packet, an inter-probe packet transmission time interval, and information related to the transmission of load packet. The information related to the transmission rate of load packet may include the number of load packets, the transmission time interval between load packets, and the size of load packet.

Figure 3A:
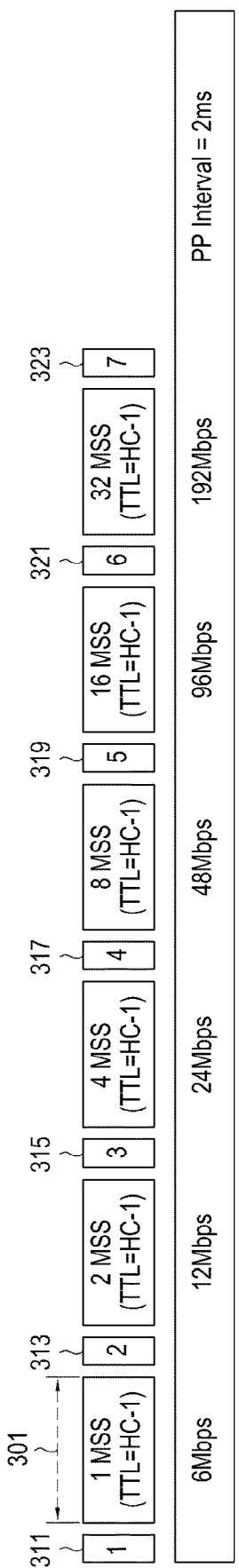
FIGS. 3A and 3B are views illustrating configurations of probe packet trains according to embodiments of the present disclosure.
Figure 3B:
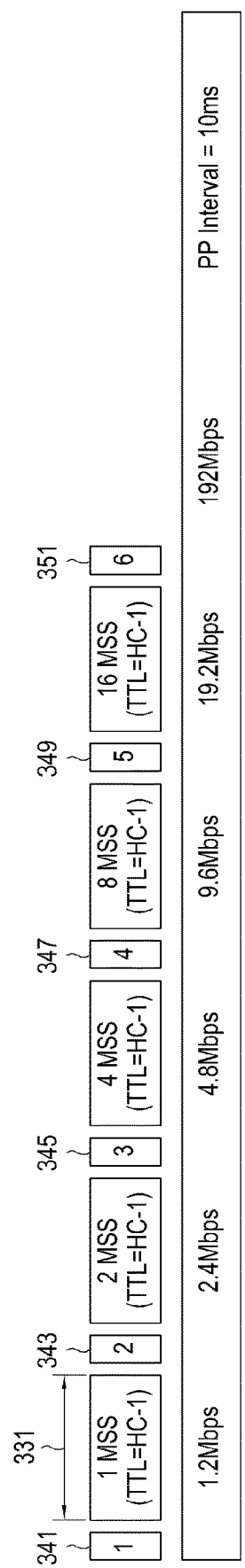

FIGS. 3A and 3B are views illustrating configurations of probe packet trains according to embodiments of the present disclosure.

FIG. 3A illustrates a configuration of a probe packet train in a network with a shorter round-trip time (RTT) and a broader bandwidth, as an example, according to an embodiment of the present disclosure. Examples of the shorter-RTT, broader-bandwidth network may include an LTE network or 5-generation (5G) network.

Referring to FIG. 3A, the transmission time interval 301 between consecutive probe packets is 2 ms, and when the number of probe packets 311, 313, 315, 317, 319, 321, and 323 in the probe packet train is determined to be seven, 12 ms is used to transmit the probe packet train. Load packets between the probe packets are transmitted. When the amount of data included in the load packets increases every two times from 1 maximum segment size (MSS) (e.g., 1500 bytes), load packets corresponding to 63MSS (=1MSS+2MSS+4MSS+8MSS+16MSS+32MSS) in total may be included in the probe packet train. When the amount of data included in the load packets is 1MSS, the transmission rate becomes 6 Mbps(=(1500 bytes×8)(bits)/2 ms). As the amount of data included in the load packets increases, the transmission rate increases as well.

FIG. 3B illustrates a configuration of a probe packet train in a network with a longer round-trip time (RTT) and a shorter bandwidth, as an example, according to an embodiment of the present disclosure. Examples of the longer-RTT, shorter-bandwidth network may include a 3G network.

Referring to FIG. 3B, the transmission time interval (PPI) 331 between consecutive probe packets is 10 ms, and when the number of probe packets 341, 343, 345, 347, 349, and 351 in the probe packet train is determined to be six, 50 ms is used to transmit the probe packet train. When the amount of data included in the load packets which are transmitted between the probe packets increases from 1MSS (e.g., 1500 bytes) every two times, load packets corresponding to a total of 31MSS may be included in the probe packet train. When the amount of data included in the load packets is 1MSS, the transmission rate becomes 1.2 Mbps(=(1500 bytes×8)(bits)/10 ms). As the amount of data included in the load packets increases, the transmission rate increases as well.

The number of probe packets, transmission time interval between probe packets, and transmission rate of load packet may be varied depending on the characteristics and environments of network. The UE may determine the network characteristics and let the server know.

Figure 4:
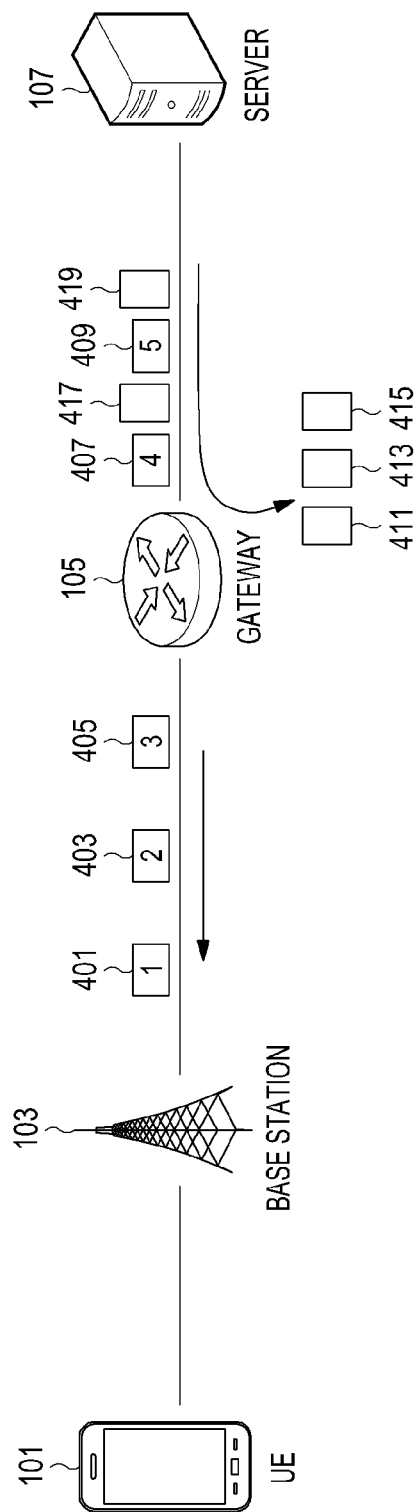
FIG. 4 is a view illustrating transmission of a probe packet train according to an embodiment of the present disclosure.

FIG. 4 is a view illustrating transmission of a probe packet train according to an embodiment of the present disclosure.

Referring to FIG. 4, a server 107 generates a probe packet train that it is to transmit, in order to grasp the circumstance of data transmission path with a UE 101. As an example, the probe packet train may be in the form shown in FIG. 3A or 3B.

The server 107 sets the TTL of the load packets 411, 413, 415, 417, and 419 included in the probe packet train to be one hop shorter, i.e., so that the TTL elapses when they arrive at the gateway 105 which is one hop closer to the server at the IP level, and the server 107 transmits the probe packet train to the gateway 105.

The gateway 105 discards the load packets 411, 413, and 415 and transmits only the probe packets 401, 403, and 405 to the base station 103 because the TTL of the load packets 411, 413, and 415 has elapsed despite receiving the probe packet train. The base station 103 transmits the probe packets 401, 403, and 405 to the UE 101. Through such procedure, the UE receives the probe packets 401, 403, and 405 with the load packets excluded and may determine the section where a bottleneck, i.e., congestion, has occurred on the data transmission path between the UE and the server based on the received probe packets.

Figure 5:
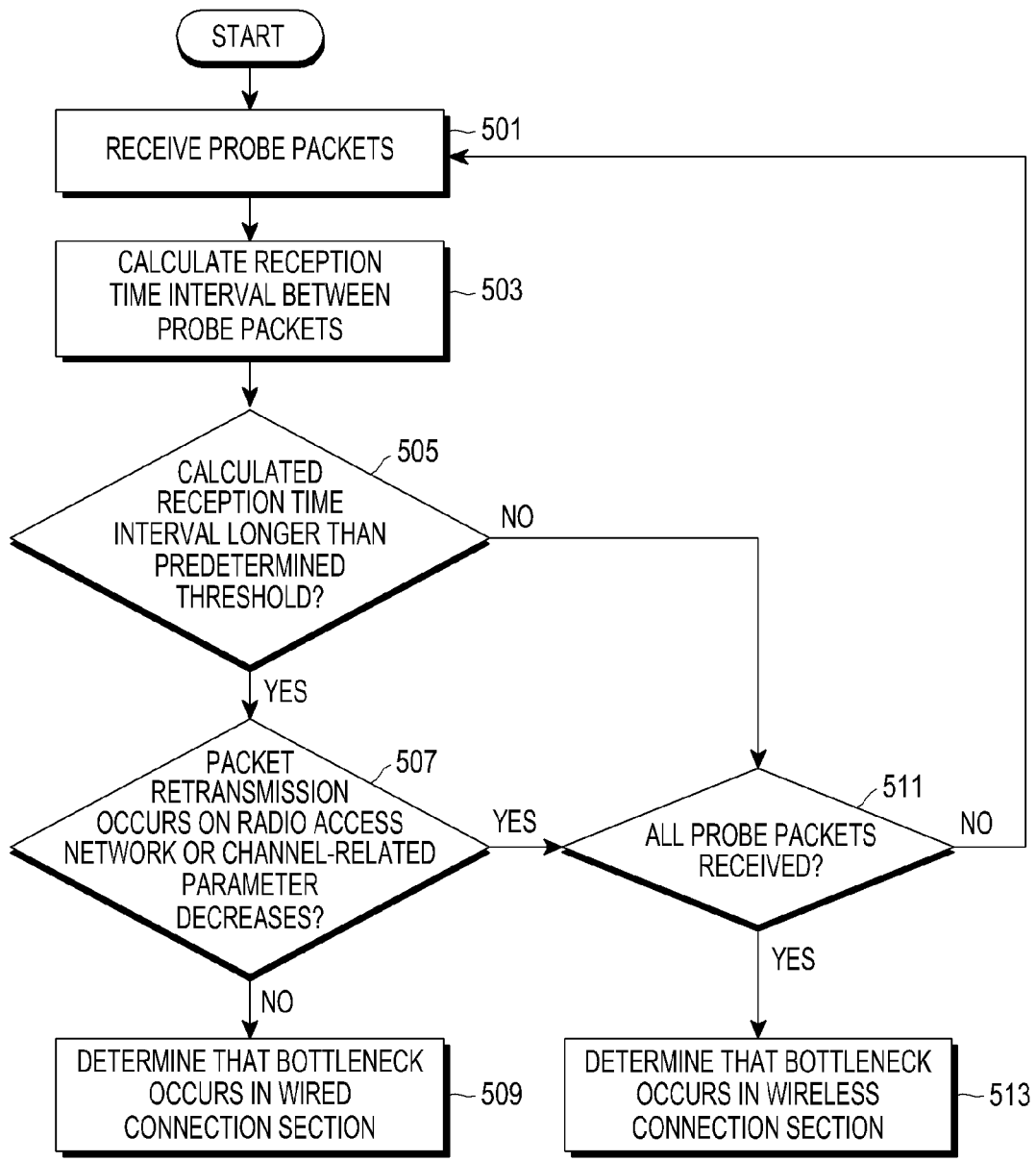
FIG. 5 is a flowchart illustrating a method for determining a section where a UE has a bottleneck according to an embodiment of the present disclosure.

FIG. 5 is a flowchart illustrating a method for determining a section where a UE has a bottleneck according to an embodiment of the present disclosure.

Referring to FIG. 5, the UE receives a first probe packet (501).

After receiving the first probe packet, the UE receives a second probe packet (501).

The UE measures the time of reception of the first probe packet and the time of reception of the second probe packet and calculates the interval in time of reception between the two consecutive probe packets (503).

The UE determines whether the interval in time of reception calculated is larger than a predetermined threshold (505). According to an embodiment of the present disclosure, the predetermined threshold may be an integer multiple of the time interval during which the server transmits the probe packets.

When the time interval calculated is larger than the threshold, the UE may doubt a bottleneck in the wired connection section of the data transmission path. At this time, in order to determine whether a drastic variation has occurred in the circumstance of the wired connection section in the data transmission path, the UE determines whether retransmission of packet has occurred in the radio access network (RAN) or the channel quality parameter (e.g., channel quality index (CQI), reference signal received power (RSRP), or reference signal received quality (RSRQ)) has decreased (507). As an example, the UE may determine whether the reduction in the channel quality parameter exceeds a predetermined threshold.

Upon determining that no drastic variation occurs in the circumstance of the wired connection section based on the channel quality parameter, the UE determines that a bottleneck has occurred in the wired connection section (509). Additionally, the UE may estimate the transmission rate of load packet using information contained in the probe packet received immediately before. The UE may determine that the estimated transmission rate is currently the optimal transmission rate for the data transmission path.

Upon determining that no drastic variation in the circumstance of the wired connection section (507) or when the calculated time interval is not larger than the threshold (505), the UE determines whether the probe packets in the probe packet train all have been received (511).

When all of the probe packets have been received, the UE determines that a bottleneck has occurred in the wireless connection section in the data transmission path (513). The UE may determine the degree of congestion in the wireless connection section using the reception pattern of all the probe packets. A procedure for determining the degree of congestion of the wireless connection section is described below.

However, when all of the probe packets in the probe packet train are not received, the UE receives a next probe packet (501) and repeats the above procedures.

Figure 6A:
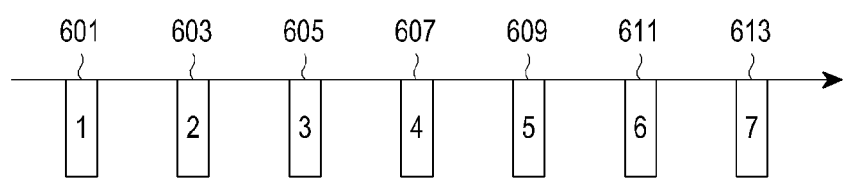
FIGS. 6A and 6B are views illustrating procedures for determining the degree of congestion in a wireless connection section using the reception pattern of probe packets according to an embodiment of the present disclosure.
Figure 6B:
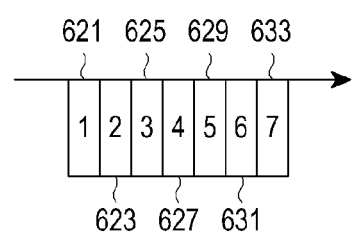

FIGS. 6A and 6B are views illustrating procedures for determining the degree of congestion in a wireless connection section using the reception pattern of probe packets according to an embodiment of the present disclosure.

FIG. 6A illustrates probe packets received to a UE when no bottleneck occurs in a wireless connection section.

Referring to FIG. 6A, a server transmits a total of seven probe packets in one probe packet train, and the UE receives the seven probe packets 601, 603, 605, 607, 609, 611, and 613. When the seven probe packets 601, 603, 605, 607, 609, 611, and 613 are received via seven bursts in seven different scheduling intervals as per the scheduling of a base station, it means that the base station located between the server and the UE has sent, without delay, to the UE the seven probe packets 601, 603, 605, 607, 609, 611, and 613 which the server has transmitted in predetermined time intervals. That is, it means that, since no bottleneck occurs in the wireless connection section between the base station and the UE, the packets received by the base station are able to immediately be sent out. Accordingly, where the probe packets constituting the probe packet train are received via seven bursts or a predetermined number of bursts or more, the UE may determine that the utilization of the base station is very low.

FIG. 6B illustrates probe packets received to a UE when a bottleneck occurs in a wireless connection section.

Referring to FIG. 6B, like in the case of FIG. 6A, a server transmits a total of seven probe packets, and the UE receives the seven probe packets 621, 623, 625, 627, 629, 631, and 633. However, unlike in the case of FIG. 6A, the UE consecutively receives the seven probe packets 621, 623, 625, 627, 629, 631, and 633 via one burst according to the scheduling of the base station. If the wireless connection section is in congestion although the base station located between the server and the UE receives the seven probe packets 621, 623, 625, 627, 629, 631, and 633, which the server has transmitted, in predetermined time intervals, the transmission of the seven probe packets may be delayed in the base station. This is why the base station performs proportional fair scheduling on each UE in a queue. Accordingly, where the probe packets constituting the probe packet train are received via one burst or less than a predetermined number of bursts, the UE may determine that the utilization of the base station is very high.

In another embodiment, the degree of occurrence of a bottleneck in the wireless connection section may be determined depending on the reception time intervals of the probe packets that the UE receives.

Figure 7A:
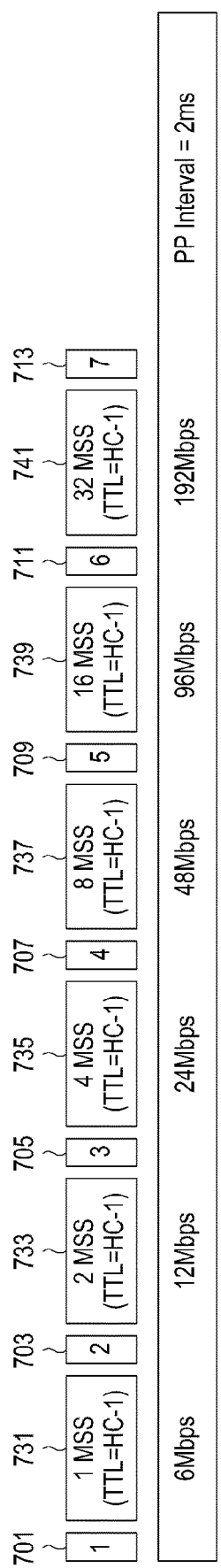
FIGS. 7A and 7B are views illustrating operations for determining a bottleneck in a wireless connection section according to an embodiment of the present disclosure.
Figure 7B:
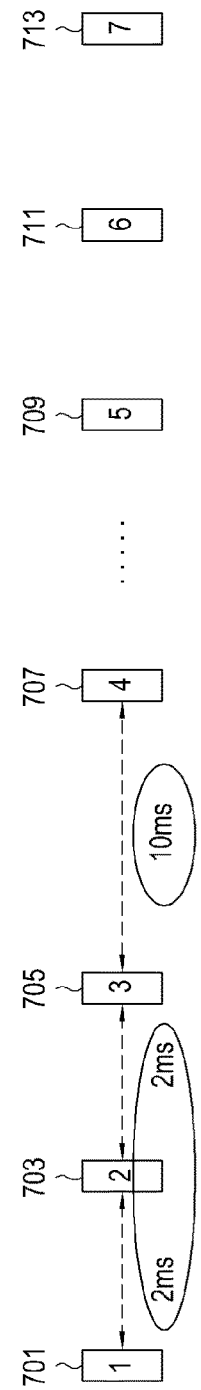

FIGS. 7A and 7B are views illustrating operations for determining a bottleneck in a wireless connection section according to an embodiment of the present disclosure.

FIG. 7A illustrates a probe packet train that a server transmits, and FIG. 7B illustrates probe packets that a UE receives in the probe packet train.

Referring to FIG. 7A, the server transmits seven probe packets 701, 703, 705, 707, 709, 711, and 713, and six load packets 731, 733, 735, 737, 739, and 741, each of which is included between two consecutive ones of the probe packets, in the probe packet train.

The server may include information related to the transmission of the seven probe packets 701, 703, 705, 707, 709, 711, and 713 and the six load packets 731, 733, 735, 737, 739, and 741 in at least one of the seven probe packets. In another embodiment, the server may provide the UE with the information related to the probe packets and load packets constituting the probe packet train via separate control information.

The transmission rate of the first load packet 731 is 6 Mbps, and the transmission rate of the second load packet 733 is 12 Mbps. The transmission rates of the subsequent load packets 735, 737, 739, and 741 are 24 Mbps, 48 Mbps, 96 Mbps, and 192 Mbps. The transmission time interval between probe packets is 2 ms.

Referring to FIG. 7B, the UE receives the first to third probe packets 701, 703, and 705 in the 2 ms transmission time intervals. However, the UE receives the fourth probe packet 707 10 ms after receiving the third probe packet 705.

Since the UE normally receives up to the third probe packet 705, the UE may estimate that the optimal transmission rate in the current data transmission path is 12 Mbps from the load packet received immediately before the third probe packet 705.

Since the transmission time interval between the third probe packet 705 and the fourth probe packet 707 is larger than the previous transmission time interval, the UE may estimate that there is a bottleneck in the wired connection section. At this time, for more precise determination, the UE may delay the determination of the optimal transmission rate and a bottleneck to after all of the probe packets are received.

However, despite the above-described method, the UE may not specifically determine the section where a bottleneck occurs in the wired connection section. That is, the UE may not determine which one of the connection section between the base station and the gateway and the connection section between the gateway and the server a bottleneck occurs in.

Now described are embodiments to address such issues.

Figure 8:
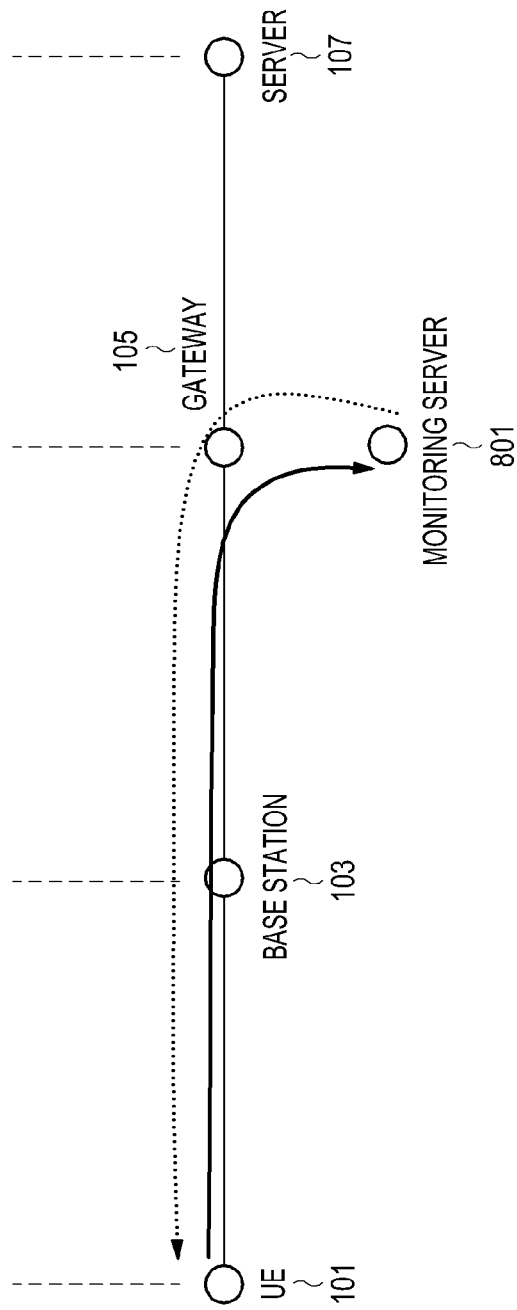
FIG. 8 is a view illustrating a configuration for determining a wired connection section where a bottleneck occurs according to an embodiment of the present disclosure.

FIG. 8 is a view illustrating a configuration for determining a wired connection section where a bottleneck occurs according to an embodiment of the present disclosure.

Referring to FIG. 8, a separate monitoring server 801 is added to determine the wired connection section where a bottleneck occurs. The monitoring server 801 is connected to the gateway 105 on the data transmission path.

Upon estimating that a bottleneck occurs in the wired connection section, the UE 101 transmits information about the optimal transmission rate to the monitoring server 801 to determine which one of the connection section between the base station 103 and the gateway 105 and the connection section between the gateway 105 and the server 107 the bottleneck occurs in. The optimal transmission rate may be estimated using the information contained in the probe packet received immediately before, as set forth supra.

The monitoring server 801 generates a probe packet train based on the optimal transmission rate and transmits the probe packet train. However, the monitoring server 801 includes no load packet in the probe packet train. The monitoring server 801 sets the transmission rate to be a predetermined value larger than the optimal transmission rate, and the monitoring server 801 generates and transmits a probe packet train constituted of probe packets alone.

When the UE 101 receives the probe packets in the same transmission time intervals as the monitoring server 801, the UE 101 may determine that the section where a bottleneck occurs is the connection section between the server 107 and the gateway 105. In other words, the UE measures the reception time intervals of the probe packets from the monitoring server and determines whether the reception time intervals measured are the same or similar, in a predetermined range, to the transmission time intervals of the monitoring server which is previously known. Where the measured reception time intervals are the same or similar, in the predetermined range, to the transmission time intervals of the monitoring server, the UE may determine that a bottleneck occurs in the connection section between the server and the gateway.

However, when the reception time intervals of the probe packets are not the same as the transmission time intervals of the monitoring server 801 or the differences exceed a predetermined range, the UE 101 may determine that a bottleneck occurs in the connection section between the gateway 105 and the base station 103.

Figure 9:
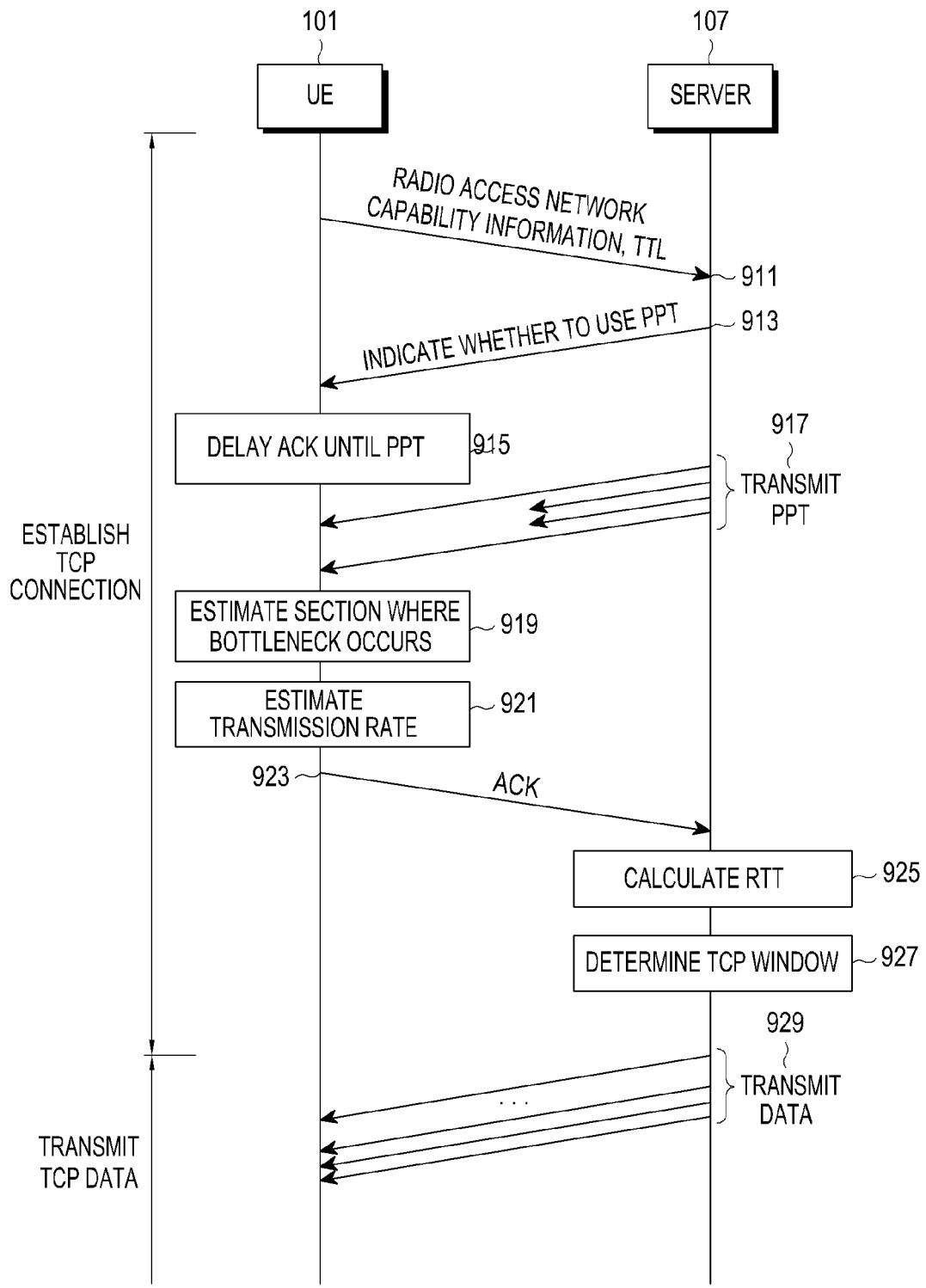
FIG. 9 is a view illustrating a TCP procedure to which an embodiment of the present disclosure applies.

FIG. 9 is a view illustrating a TCP procedure to which an embodiment of the present disclosure applies.

A UE 101 establishes a transmission control protocol (TCP) connection with a server 107. At this time, since the UE 101 is unaware whether the server 107 is to use a probe packet train, the UE 101 may transmit, to the server 107, information (e.g., whether to connect to a 3G/4G/5G network) about the UE's radio access network capability and information (e.g., hop count information between UE and server) about the default TTL while syncing for the TCP connection (911).

The server 107 may transmit an indication that it is to use the power transmitter to the UE 101 based on the server's capability for the probe packet train and the information that the UE 101 has transmitted (913). The indication may contain information about time duration during which the probe packet train is transmitted, for example.

The UE 101, upon receipt of the indication of the server 107 to use the probe packet train, may delay the transmission of an acknowledgment for the TCP packet until the probe packet train is received (915).

The server 107 may generate the probe packet train and transmit the probe packet train to the UE 101 (917).

The UE 101 may estimate the connection section where a bottleneck occurs based on the reception of the probe packet train according to the above-described embodiments (919).

Upon determining that a bottleneck occurs in the wireless connection section, the UE 101 may estimate the transmission rate from the radio channel information that the UE 101 has measured (921). Thereafter, the UE 101 may carry the estimated transmission rate on the acknowledgment to the server 107 (923).

Alternatively, the UE 101 may transmit the measured radio channel information to the server 107 without directly estimating the transmission rate (923). The acknowledgment may contain radio channel information or information about the transmission rate upon detecting a bottleneck in the wireless connection section.

The transmission rate of the wireless connection section may be estimated using the following equation.

Transmission rate of wireless connection section=transmission rate of wireless connection section based on CQI×(1/(number of probe packets in probe packet train−(number of probe packets burs among probe packets in probe packet train −1)))

The burst probe packets are defined as probe packets received within the scheduling interval of the base station.

The server 107 calculates the RTT except the period that the probe packet train has been transmitted (925).

The server 107 may determine an initial TCP window based on the calculated RTT (927). Where the acknowledgment contains the transmission rate information, the server 107 recognizes that a bottleneck occurs in the wireless connection section. Thus, the server 107 may determine the initial TCP window under the estimation that no bottleneck occurs in the wired connection section. In another embodiment, the server 107 may receive, from the UE 101, information about the degree of congestion based on the reception pattern of the probe packets that the UE 101 has received, and the server 107 may determine the initial TCP window using the information about the degree of congestion alone or additionally.

The server 107 transmits data based on the determined TCP window (929).

Examples of applying embodiments of the present disclosure to adaptive streaming are described below.

A server which offers stream, such as of Youtube or Netflix, previously encodes video at multiple encoding rates and adaptively provides the UE with a streaming service in proper quality depending on network environment. The server transmits video in units, called chunks, as per the encoding rate that the UE has requested. However, when the UE fails to precisely estimate the status of the network, such an event as rebuffering or quality deterioration may arise. Such event as rebuffering or quality deterioration may be recongized as a lowering in the user's experience capability.

Where embodiments of the present disclosure apply to adaptive streaming services, the UE may use a probe packet train in setting up a connection to receive a video streaming service from the server. The server may generate load packets with a transmission rate set to fit the encoding rate, include the load packets in the probe packet train, and transmit the probe packet train to the UE. The UE may determine whether a bottleneck occurs, and if so, which connection section the hardware button occurs in, by the above-described embodiments, and the UE may estimate the encoding rate. The UE transmits information about the estimated encoding rate to the server, and the server transmits chunks corresponding to the received encoding rate to the UE, providing an adaptive streaming service. An embodiment of the present disclosure enables providing an adaptive streaming service at a proper encoding rate from the beginning. Such encoding rate determination may not only be performed at the beginning of streaming but be re-performed in the middle of the streaming.

Applying embodiments of the present disclosure to selection of a contents delivery network (CDN) server is described below.

A UE collects lists of accessible CDN servers from manifest files. The UE requests an accessible CDN server to transmit a probe packet train. The UE determines, per accessible CDN server, whether a bottleneck occurs, and if so, which connection section the bottleneck occurs in, by the above-described embodiments, estimates transmission rates, and selects the CDN server with the transmission rate estimated to be the highest. The UE connects to the selected CDN server. Selecting the CDN server may be re-performed by re-transmitting a probe packet train in the middle of transmitting files, as necessary.

Figure 10:
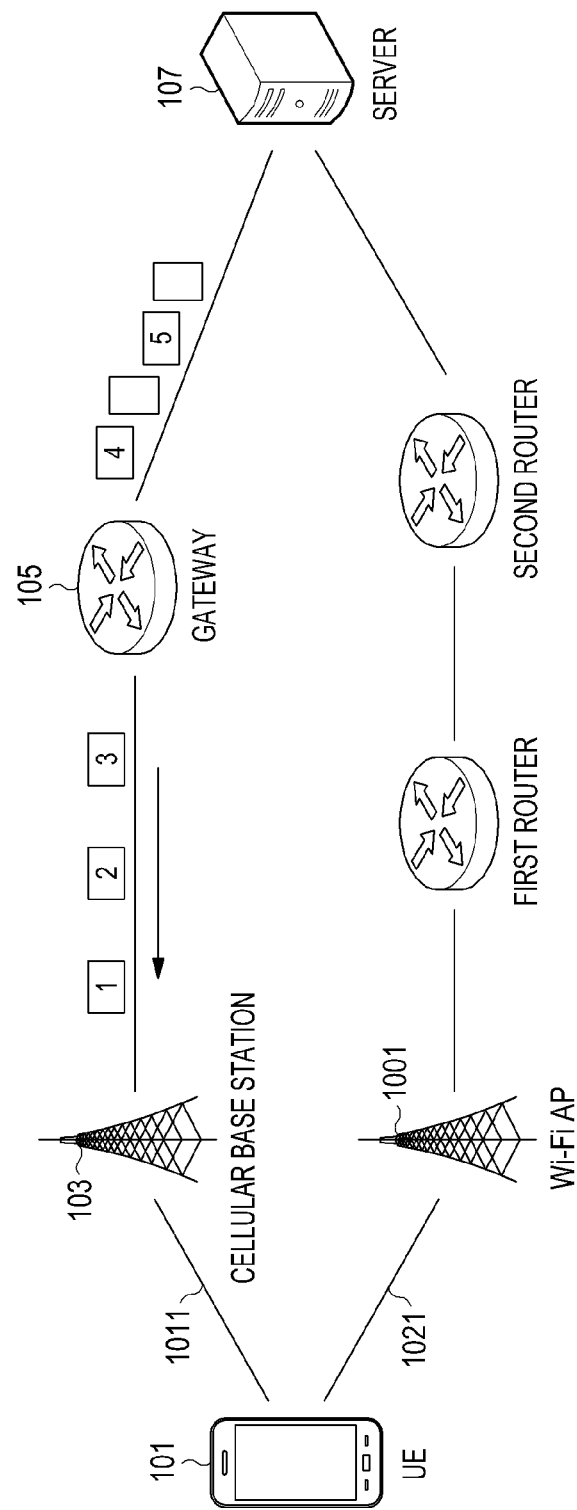
FIG. 10 is a view illustrating an example of resolving a bottleneck that arises, according to an embodiment of the present disclosure.

FIG. 10 is a view illustrating an example of resolving a bottleneck that arises, according to an embodiment of the present disclosure.

Referring to FIG. 10, a UE 101 may connect to a cellular base station 103 or wireless-fidelity (Wi-Fi) access point (AP) 1001.

Connected with the cellular base station 103, the UE estimates the connection section where a bottleneck occurs according to the above-described embodiments.

Upon estimating that a bottleneck occurs in a wireless connection section 1011, the UE 101 disconnects from the cellular base station 103 and connects to the Wi-Fi AP 1001 (1021).

Upon estimating that a bottleneck occurs in a wired connection section, the UE 101 remains connecting (1011) with the cellular base station 103 while connecting (1021) with the Wi-Fi AP 1001, availing it of multiple wired paths. The UE 101 may enjoy the effect of integration of bandwidths via use of the plurality of wired paths.

Figure 11:
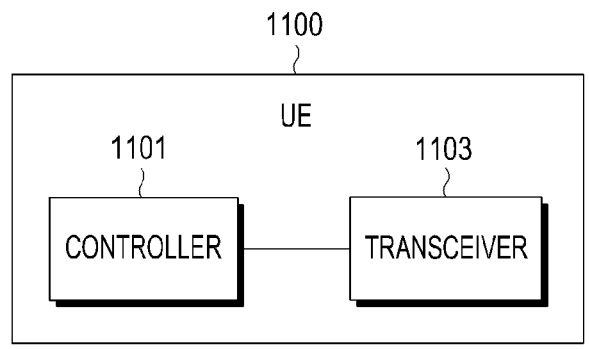
FIG. 11 is a view illustrating a configuration of a UE according to an embodiment of the present disclosure.

FIG. 11 is a view illustrating a configuration of a UE according to an embodiment of the present disclosure. For ease of description, components not directly related to the present disclosure are neither shown nor described.

Referring to FIG. 11, a UE 1100 may include a controller 1101 and a transceiver 1103. Although an example is described here that operations are performed with the controller 1101 and the transceiver 1103 separated from each other, all of the operations may also be performed in a single component as necessary. Or, the components may be divided into more components.

The transceiver 1103 may receive probe packets from a base station and transmit information related to an estimated transmission rate to the base station.

The controller 1101 may control the operation of the transceiver 1103, estimate the connection section where a bottleneck occurs from the received probe packets, and estimate the transceiver rate when the bottleneck occurs.

Figure 12:
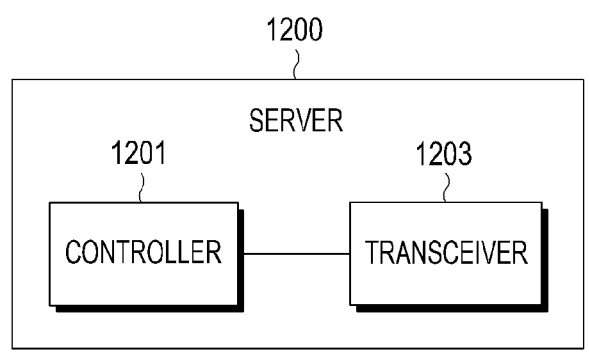
FIG. 12 is a view illustrating a configuration of a server according to an embodiment of the present disclosure.

FIG. 12 is a view illustrating a configuration of a server according to an embodiment of the present disclosure. For ease of description, components not directly related to the present disclosure are neither shown nor described.

Referring to FIG. 12, the server 1200 may include a controller 1201 and a transceiver 1203. Although an example is described here that operations are performed with the controller 1201 and the transceiver 1203 separated from each other, all of the operations may also be performed in a single component as necessary. Or, the components may be divided into more components.

The transceiver 1203 may transmit a generated probe packet train to a UE and receive transmission rate-related information from the UE.

The controller 1201 may control the operation of the transceiver 1203 and generate the probe packet train.

As is apparent from the foregoing description, according to the present disclosure, the UE may detect the section where a bottleneck occurs in a data transmission path. The UE may also infer the transmission rate of the section. The UE transmits the inferred transmission rate to the server, allowing the server to adjust the transmission speed (or transmission rate).

The embodiments herein are provided merely for better understanding of the present disclosure, and the present disclosure should not be limited thereto or thereby. In other words, it is apparent to one of ordinary skill in the art that various changes may be made thereto without departing from the scope of the present disclosure. Further, the embodiments may be practiced in combination.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for detecting congestion in a current data transmission path comprising a wired connection section and a wireless connection section by a user equipment (UE), the method comprising:

receiving, via the current data transmission path, a first probe packet including information on transmission rates of load packets and a transmission time interval between probe packets;

receiving, via the current data transmission path, a second probe packet;

measuring a time interval between a reception of the first probe packet and a reception of the second probe packet;

determining whether the measured time interval exceeds a first threshold;

determining whether a reduction in a channel quality parameter of the wireless connection section exceeds a second threshold in response to determining that the measured time interval exceeds the first threshold;

determining that a bottleneck occurs in the wired connection section in response to determining that the reduction in the channel quality parameter does not exceed the second threshold;

estimating a transmission rate of a load packet from among the load packets using the information included in the first probe packet; and determining the estimated transmission rate as a transmission rate for the current data transmission path.

2. The method of claim 1, further comprising determining whether the bottleneck occurs using a subsequent probe packet received when the measured time interval is less than the first threshold.

3. The method of claim 2, further comprising:

determining that the bottleneck occurs in the wired connection section in response to determining that the bottleneck does not occur in the wireless connection section based on the reduction in the channel quality parameter; and in case that the bottleneck occurs in the wireless connection section, estimating a degree of congestion of the wireless connection section using reception patterns of the received (i) first and second probe packets and (ii) subsequent probe packet.

4. The method of claim 1, wherein times to live (TTLs) of the load packets are set to be shorter than TTLs of the first and second probe packets.

5. The method of claim 1, wherein the information on the transmission rates of the load packets includes at least one of a number of the load packets, transmission time intervals of the load packets, or sizes of the load packets.

6. The method of claim 1, further comprising determining which one of a first section between a gateway and a server and a second section between a base station and the gateway the bottleneck occurs in based on the transmission rate for the current data transmission path, wherein the wired connection section includes the first section and the second section.

7. The method of claim 1, wherein the first threshold is determined based on the transmission time interval.

8. A user equipment (UE) for detecting congestion in a current data transmission path comprising a wired connection section and a wireless connection section, the UE comprising:
- a transceiver configured to:
  - receive, via the current data transmission path, a first probe packet including information on transmission rates of load packets and a transmission time interval between probe packets; and
  - receive, via the current data transmission path, a second probe packet; and
- a controller configured to:
  - measure a time interval between a reception of the first probe packet and a reception of the second probe packet;
  - determine whether the measured time interval exceeds a first threshold,
  - determine whether a reduction in a channel quality parameter of the wireless connection section exceeds a second threshold in response to determining that the measured time interval exceeds the first threshold;
  - determine that a bottleneck occurs in the wired connection section in response to determining that the reduction in the channel quality parameter does not exceed the second threshold;
  - estimate a transmission rate of a load packet from among the load packets using the information included in the first probe packet; and
  - determine the estimated transmission rate as a transmission rate for the current data transmission path.

9. The UE of claim 8, wherein the controller is configured to determine whether the bottleneck occurs using a subsequent probe packet received when the measured time interval is less than the first threshold.

10. The UE of claim 9, wherein the controller is configured to:
- determine that the bottleneck occurs in the wired connection section in response to determining that the bottleneck does not occur in the wireless connection section based on the reduction in the channel quality parameter; and
- in case that the bottleneck occurs in the wireless connection section, estimate a degree of congestion of the wireless connection section using reception patterns of the received (i) first and second probe packets and (ii) subsequent probe packet.

11. The UE of claim 8, wherein times to live (TTLs) of the load packets are set to be shorter than TTLs of the first and second probe packets.

12. The UE of claim 8, wherein the information on the transmission rates of the load packets includes at least one of a number of the load packets, transmission time intervals of the load packets, or sizes of the load packets.

13. The UE of claim 8, wherein the controller is configured to determine which one of a first section between a gateway and a server and a second section between a base station and the gateway the bottleneck occurs in based on the transmission rate for the current data transmission path,
wherein the wired connection section includes the first section and the second section.

14. The UE of claim 8, wherein the first threshold is determined based on the transmission time interval.

* * * * *